Feb. 22, 1955  P. GREEN  2,702,574
METHOD AND MACHINE FOR REMOVING SKINS FROM NUTS
Filed April 19, 1951  2 Sheets-Sheet 2

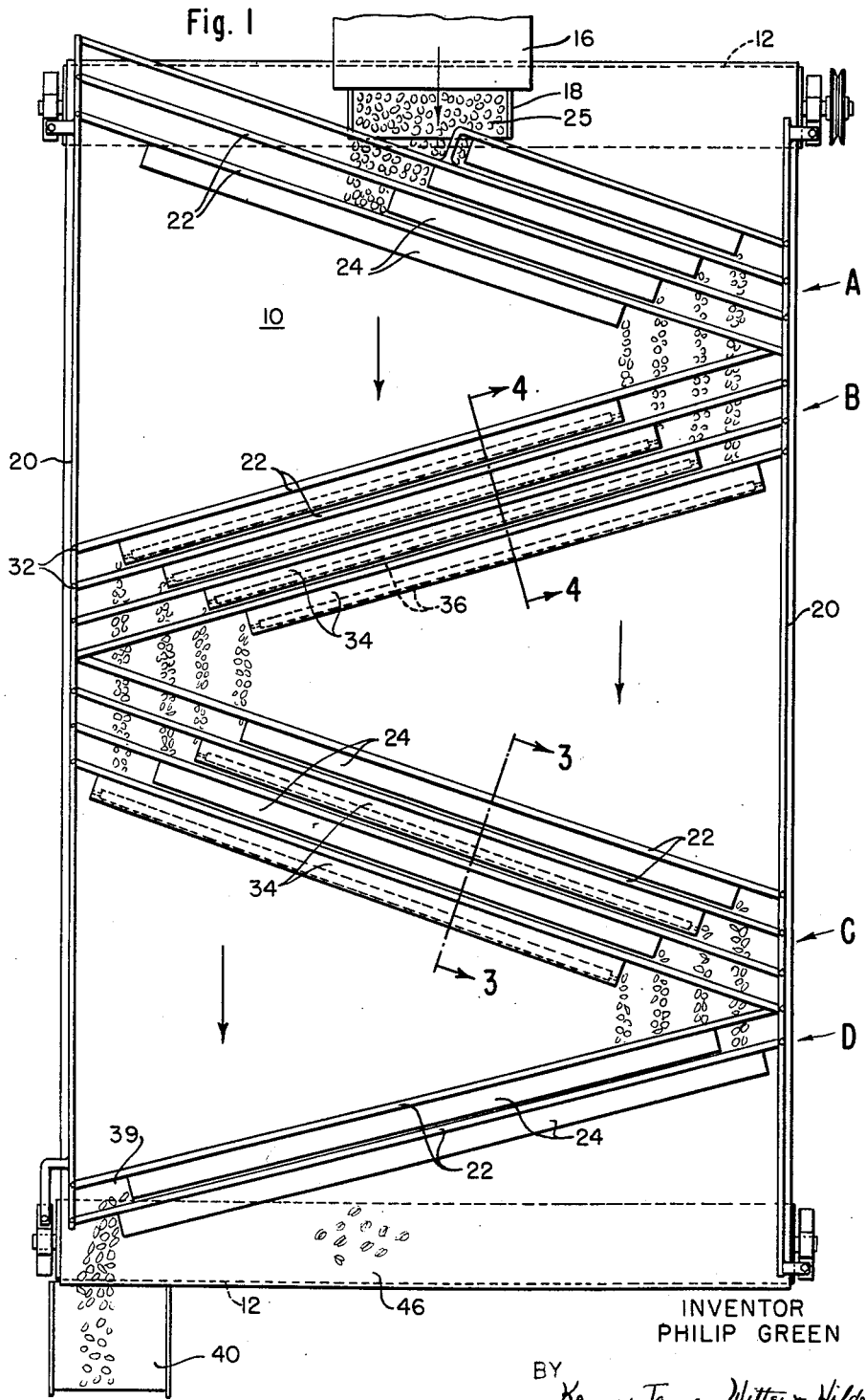

INVENTOR
PHILIP GREEN
BY
Kenway, Jenney, Witter & Hildreth
ATTORNEYS

United States Patent Office 2,702,574
Patented Feb. 22, 1955

2,702,574

METHOD AND MACHINE FOR REMOVING SKINS FROM NUTS

Philip Green, Tyrone, Pa., assignor to James W. Gardner, Tyrone, Pa.

Application April 19, 1951, Serial No. 221,873

6 Claims. (Cl. 146—226)

This invention relates to a novel method and apparatus for removing skins from nuts without crushing or breaking the nuts. In my copending application Serial No. 39,211, filed July 17, 1948, now Patent 2,605,797 dated August 5, 1952, I have disclosed a nut blanching method and machine embodying three steps, namely, (1) slitting the skins on the nuts, (2) scalding the slitted nuts and (3) removing the skins by rubbing action. This step of removing skins from nuts has heretofore been commonly performed by rubbing the nuts between opposed surfaces all of which causes some disintegration and breaking of the nuts. My invention herein comprises a new and improved method and apparatus for performing the third step of removing the skins from the nuts whereby this breakage is substantially eliminated.

My invention contemplates moving the nuts forwardly on an endless and substantially horizontal conveyor while so obstructing forward movement of the nuts that they are rolled loosely against the conveyor and the obstructing means and the skins thereby slipped from the nuts. More specifically the nut obstructing means comprises a series of relatively long abutments disposed in reversely inclined directions across the conveyor in position thus to roll the nuts back and forth across the conveyor, thereby removing the skins. The removed skins are carried along on the conveyor and removed independently of the nuts which follow along the abutments to an exit. Thus the skins are moved and separated from the nuts and the whole and clean nuts are automatically deposited at the predetermined exit. The production of an improved method and apparatus of this nature for performing the skin removing operation comprises the primary object of my invention.

These and other features of the invention will be best understood and appreciated from the following description of a preferred embodiment thereof selected for purposes of illustration and shown in the accompanying drawings, in which:

Fig. 1 is a plan view of a machine embodying my invention,

Figure 6:
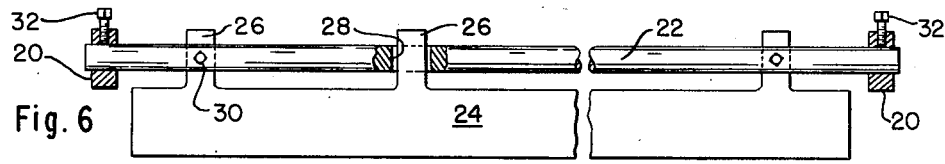
Fig. 6 is an enlarged fragmentary view of a detail.
Figure 2:
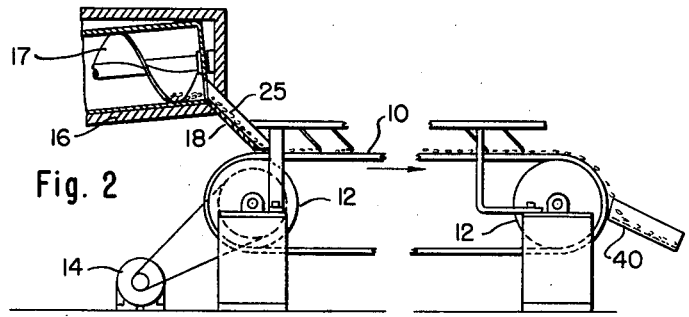
Fig. 2 is a fragmentary side elevation on reduced scale of the machine.

The machine illustrated in the drawings comprises an endless belt conveyor 10 supported at its ends on rotary drums 12 one of which is driven in the direction of the arrow by a motor 14. Nuts, more particularly peanuts, which have been blanched in a tank 16, are fed by a screw conveyor 17 within the tank to a chute 18 and from thence onto the substantially horizontal top reach of conveyor 10. The mechanism associated therewith and now to be described is to remove the skins from the nuts.

Supported on two plates 20 extending longitudinally of the machine at opposite sides thereof are a plurality of groups of parallel rods 22 extending zig-zag inclined directions across the conveyor, and baffle-like abutments hung from these rods are adapted to obstruct movement of the nuts on and with the conveyor and cause them to travel with the conveyor at reduced speed and in a zig-zag path across the conveyor, thereby removing the skins from the nuts by the combined opposing engagement of the conveyor and abutments therewith.

Figure 3:
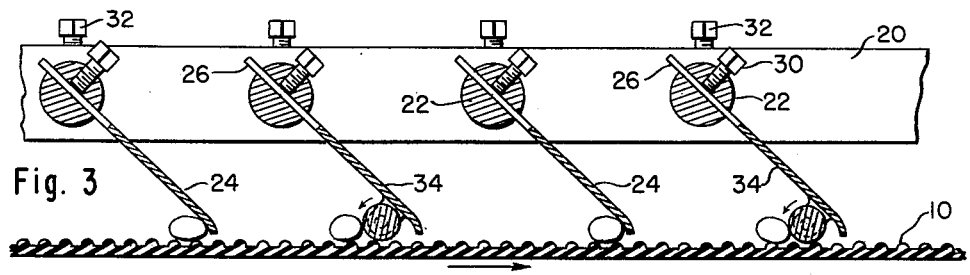
Fig. 3 is an enlarged fragmentary sectional view taken on line 3—3 of Fig. 1.
Figure 4:
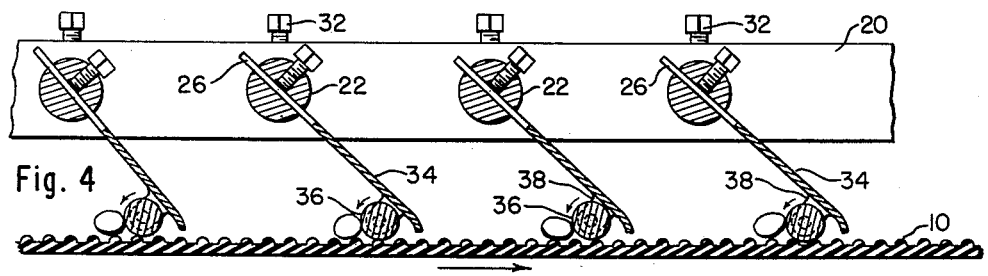
Fig. 4 is a like view taken on line 4—4 of Fig. 1.

The first group A of baffle abutments comprises a plurality of plates 24 hung from the rods 22 thereabove and inclined downwardly from the rods in the direction of movement of the top reach of the conveyor for a purpose hereinafter described. The bottom ends of the plates are slightly spaced from the conveyor and curved as illustrated in Fig. 3. The inner ends of these plates are in staggered relation at the end of the chute 17 in position to receive from the chute substantially equal portions of the nuts 25. Each plate 24 is provided with a plurality of ears 26 at its rear margin extending through slots 28 in its rod 22 and secured in place therein by set screws 30. Certain of the rods are rotatably adjusted in the plates 20 and secured by set screws 32. Thus the plates can be adjusted transversely of the rods and rotatably about the longitudinal axes of the rods.

The second group B of baffle abutments preferably embody a plurality of plates 34 likewise adjustably mounted and each carrying a long cylindrical roller 36 at its bottom margin in frictional driving contact with the conveyor 10, each roller being supported for free rotation at its ends by brackets 38 carried by the plates. The delivery ends of the baffles 24 at A are in staggered relation respectively to deliver nuts to the receiving ends of the baffles at B as illustrated in Fig. 1.

The third group C of baffle abutments embody plates 24 and plates 34 with rollers 36 in alternate arrangement as illustrated in Figs. 1 and 3. Also the delivery ends of the baffles at B are in staggered relation respectively to deliver nuts to the receiving ends of the baffles at C as illustrated in Fig. 1.

Figure 5:
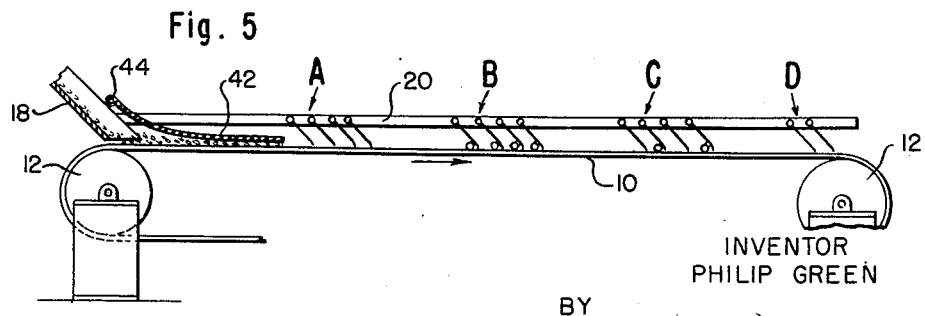
Fig. 5 is a fragmentary side elevation on reduced scale of the machine showing a further feature of the invention.

The fourth group D of baffle abutments embodies two plates 24 mounted on their rods 22 in the manner illustrated in Fig. 6. The delivery ends of the baffles at C are in staggered relation to deliver nuts to the receiving ends of the baffles at D as illustrated in Fig. 1. The delivery ends of the baffle plates 24 at D terminate short of the margin of the conveyor at 39 whereby the nuts pass therefrom to a chute 40. As illustrated in Fig. 5 a rough mat 42 or like nut engaging member is anchored at 44 and disposed to drag on the conveyor and nuts as the nuts pass from the chute 18 to the baffle plates at A, thereby roughing and loosening the skins on the nuts prior to their contact with the baffle abutments.

The nut supporting surface of the conveyor is of a frictional nature and preferably rough or pebbly like on its top surface for frictional engagement with the nuts. As the nuts pass from the chute 18 substantially equal portions are engaged by the first group of plates 24 at A. The nuts thereupon continue to travel with the conveyor but at reduced speed forwardly along the plates. The plates, being inclined downwardly in the direction of movement of the top reach, form an acute angle with the top reach whereby to trap the nuts therebeneath at the top reach and remove the skins as the nuts are rolled along beneath the abutments. As the nuts are delivered from the ends of the plates the conveyor carries them to the staggered receiving ends of the abutments at B. The nuts thereupon travel along the rollers 36 which are rotated by contact with the conveyor and serve to loosen and remove such skins as have not been removed by the plates 24 at A.

The nuts pass from the delivery ends of the rollers 36 at B to the staggered receiving ends of the abutments at C and from thence along these abutments and from the delivery ends thereof to the receiving ends of the plates 24 at D. The nuts thereupon pass along the plates 24 at D to the delivery end thereof at 39 and from thence to the chute 40. The skins removed from the nuts pass along the conveyor beneath the abutments and off the conveyor at 46, thus separating the skins and any fine particles from the nuts. The nuts delivered to the chute 40 are therefore clean, polished and unbroken due to their gentle skin removing treatment against the abutments.

It will be understood that the construction and arrangement shown in the accompanying drawings are by way of example only since various modifications can be employed within the scope of the invention. The plane baffles 24 and roller baffles 34 can be employed and arranged in any combination desired. In the arrangement illustrated all nuts are subjected to the rollers 36 at group B. The mounting of the baffles at 30 and 32 also provides for adjustment thereof relative to the conveyor to the most efficient angle for treatment of the nuts and for treating nuts varying in size.

Having thus disclosed my invention what I claim as new and desire to secure by Letters Patent is:

1. A machine for removing the skins from nuts, comprising an endless belt conveyor having a substantially horizontal top reach, means for driving the conveyor in a direction moving its top reach forwardly, a gang of relatively long and substantially parallel abutments adjacent to and inclined transversely across and above the top reach with one end of each ending within the path of the conveyor and forwardly of the other end, the forward end of each abutment extending beyond the corresponding end of the next forward abutment and the rearward end of each abutment extending beyond the corresponding end of the next rearward abutment, nuts carried forwardly by the conveyor being adapted to travel along the abutments and around the forward ends thereof, a like gang of abutments extending in like manner transversely across the conveyor but in the oppositely inclined direction forwardly of the first gang and with their forward ends ending within the path of the conveyor and their rearward ends disposed to be engaged by nuts passing around the forward ends of the first gang of abutments, said abutments being inclined downwardly adjacent to and in the direction of travel of the top reach whereby to trap the nuts therebeneath at the top reach and remove the skins as the nuts are rolled along and beneath the abutments.

2. The machine defined in claim 1 in which the rearward ends of the first gang of abutments are in staggered relation within the path of the conveyor, and means for feeding nuts onto the conveyor rearwardly of and in position to come into contact with said staggered ends.

3. The machine defined in claim 1 in which certain of the abutments comprise freely rotatable cylindrical rollers in driving engagement with the conveyor for rotating contact with the nuts.

4. A machine for removing the skins from nuts, comprising an endless belt conveyor having a substantially horizontal top reach, means for driving the conveyor in a direction moving its top reach forwardly, a relatively long abutment plate adjacent to and inclined transversely across and above the top reach with one end ending within the path of the conveyor and forwardly of the other end, nuts carried forwardly by the conveyor being adapted to engage and travel along the abutment and around said one end thereof, and a like abutment plate extending in like manner transversely across the conveyor but in the oppositely inclined direction forwardly of the first abutment and with its forward end ending within the path of the conveyor and its rearward end disposed to be engaged by nuts passing around said one end of the first abutment plate, said abutment plates being inclined at an acute angle downwardly relative to and in the direction of travel of the top reach whereby to trap the nuts within said angle between the plates and the top reach and remove the skins by rolling the trapped nuts between the plates and the traveling top reach.

5. The machine defined in claim 4 plus other abutment plates positioned in like inclined direction over the conveyor, and a freely rotatable cylindrical roller carried by each of said other plates in position to trap the nuts between the rollers and conveyor and remove the skins therefrom.

6. A method of removing the skins from nuts, which consists in supporting the nuts directly and wholly on a substantially horizontal and longitudinally traveling surface of predetermined width, and causing the nuts to move with the surface but at a reduced speed and simultaneously therewith to travel in a zig-zag path across the surface by trapping and rolling the nuts between said surface and a cooperating surface disposed adjacent to and inclined at an acute angle upwardly-rearwardly therefrom along said path, thereby removing the skins from the nuts by the combined opposing engagement of said surfaces therewith.

References Cited in the file of this patent

UNITED STATES PATENTS

| 656,719 | Gibbs | Aug. 28, 1900 |
| 866,704 | Witt | Sept. 24, 1907 |
| 1,190,950 | Piepgras | July 11, 1916 |
| 1,388,394 | Witt | Aug. 23, 1921 |
| 2,068,101 | Freund | Jan. 19, 1937 |
| 2,292,143 | Meagher | Aug. 4, 1942 |
| 2,433,730 | Bridge | Dec. 30, 1947 |
| 2,529,620 | Marnach et al. | Nov. 14, 1950 |
| 2,558,899 | Green | July 3, 1951 |

FOREIGN PATENTS

| 276,311 | Italy | July 19, 1930 |